United States Patent [19]

Burdett

[11] Patent Number: 4,652,801

[45] Date of Patent: Mar. 24, 1987

[54] METHOD AND DEVICE FOR CONTROLLING AN APPARATUS

[76] Inventor: Savile Burdett, 35 Park Avenue, Solihull, West Midlands, United Kingdom, B9I 3EJ

[21] Appl. No.: 799,967

[22] Filed: Nov. 20, 1985

[51] Int. Cl.$^4$ .................... H02P 1/04; F04D 15/00
[52] U.S. Cl. ................................ 318/481; 318/471; 318/484
[58] Field of Search ............... 318/471, 472, 473, 481, 318/484; 307/141, 592; 361/23, 28

[56] References Cited

U.S. PATENT DOCUMENTS

| | | | |
|---|---|---|---|
| 3,473,549 | 10/1969 | Moyer | 318/484 X |
| 3,700,914 | 10/1972 | Granieri et al. | 318/484 X |
| 3,721,880 | 3/1973 | Neill | 318/471 |
| 4,041,542 | 8/1977 | Pfarrer et al. | 318/471 X |
| 4,121,140 | 10/1978 | Jones | 318/484 X |
| 4,128,854 | 12/1978 | Ruminsky | 318/484 X |
| 4,510,425 | 4/1985 | Yokota et al. | 318/481 X |
| 4,524,312 | 6/1985 | Matsumoto et al. | 318/484 X |

*Primary Examiner*—William M. Shoop, Jr.
*Assistant Examiner*—Bentsu Ro
*Attorney, Agent, or Firm*—Stevens, Davis, Miller & Mosher

[57] ABSTRACT

A method of controlling a three state apparatus such as an air compressor comprises a first actuating element e.g. a motor and a second actuating element e.g. a valve, said method including the steps of sensing a variable parameter such as temperature with a sensing means whilst the apparatus is operating in a first operational state, feeding a signal produced by the sensing means to a control device, comparing the signal in the control device with datum information to detect whether the variable parameter is at a value at or above a threshold value, sending a signal to the first actuating element when the variable parameter is below the threshold value whereby the state of operation of the apparatus is changed to an off operational state, sending a signal to the second actuating element when the variable parameter is at a value at or above the threshold value whereby the state of operation of the apparatus is changed to a low load operational state.

12 Claims, 2 Drawing Figures

METHOD AND DEVICE FOR CONTROLLING AN APPARATUS

BACKGROUND TO THE INVENTION

This invention relates to a method and device for controlling an apparatus and more particularly to a method and device for controlling an apparatus, hereinafter referred to as "a three state apparatus", which has three states of operation, for example, off, high load, and low load.

An example of such an apparatus is an air compressor and the invention will be described hereinafter in relation to an air compressor, although it will be appreciated that the invention may be used to control any other desired apparatus having three operational states.

An air compressor with which the invention may be used, has a first actuating element comprising an electrically powered motor, a reservoir for compressed air, and a second actuating element comprising a valve means. When the motor is switched off, the compressed air in the reservoir may still be used, but the reservoir is not replenished. When the motor is switched on, either the valve means is operated in a high load position so that the operation of the motor replenishes the reservoir, so that the motor and hence air compressor is operating in a high load state, or the valve means is operated in a low load position so that although the motor continues to operate, the reservoir is not replenished and the motor and hence the air compressor therefore operates in a low load state.

Control devices are known to switch operation of air compressors from one state to another, in response to a signal received from a pressure sensor which senses the air pressure in the reservoir.

These control devices usually operate in one of two ways.

First, when the motor is operating in a high load state and the pressure sensed reaches a first, higher, predetermined pressure, the device switches the motor to the off state until a second, lower, predetermined pressure is sensed, when the motor is returned to its high load operational condition.

Second, when the motor is operating in a high load state, and the pressure sensed reaches a first, higher, predetermined pressure, the device signals the valve means to switch from the high load position to the low load position so that the motor continues to operate but in a low load state.

Obviously, the first manner of operation is generally the more economical at least where the motor is switched off for reasonably long periods because the motor does not continue to consume power whilst the air pressure in the reservoir falls from the first to the second predetermined pressure.

However, where for example air from the reservoir is being used at a rate only slightly less than the rate of replenishment of the reservoir, the motor is frequently switched on and off. This is undesirable as this can lead to damage to the windings of the motor through which large transient electrical currents in excess of normal operating currents, would frequently flow, causing the windings to overheat. Further, this is uneconomical.

It is therefore an object of the present invention to provide a new or improved method for controlling a three state apparatus, which overcomes or reduces this problem.

SUMMARY OF THE INVENTION

According to a first aspect of the invention a method of controlling a three state apparatus comprising a first actuating element and a second actuating element is provided, said method including the steps of sensing a variable parameter with a sensing means whilst the apparatus is operating in a first operational state, feeding a signal produced by the sensing means to a control device, comparing the signal in the control device with datum information to detect whether the variable parameter is at a value at or above a threshold value, sensing a signal to the first actuating element when the variable parameter is below the threshold value whereby the state of operation of the apparatus is changed to one of second and third operational states, sending a signal to the second actuating element when the variable parameter is at a value at or above the threshold value whereby the state of operation of the apparatus is changed to the other of said second and third operational states.

Thus where the invention is applied to a three state apparatus including a motor and a valve means for example, such as an air compressor, the temperature of the windings of the motor may be sensed. If when the pressure in an air reservoir of the compressor reaches a predetermined pressure, the temperature of the windings of the motor is below a threshold temperature, a signal may be sent to the motor, to switch the motor off; if when the pressure in the air reservoir attains the predetermined pressure, the temperature of the windings of the motor is above the threshold temperature, a signal may be sent to the valve means whereby the state of operation of the apparatus may be changed to a low load state, so that the motor is not switched off.

Thus the windings of the motor will be protected as the frequency of switching on and off of the motor will be controlled.

Thus, generally, when it is desired to change the state of operation of the apparatus, and the variable parameter is at a value below the threshold value, the operation of the apparatus may be changed to the second operational state, and where the value of the variable parameter is at or above the threshold value, the operation of the apparatus may be changed to the third operational state.

If desired, said signal from the sensing means may be compared with said datum information to detect whether the variable parameter is at or above a second threshold value higher than the first mentioned threshold value, and a signal is sent to the first and/or second actuating element when the variable parameter is above the second threshold value, to change the state of operation of the apparatus to said other of said second and third operational states.

Thus in an air compressor application, if at any time the temperature of the windings of the motor exceeds the second threshold value, the motor may be switched to the off state regardless of the pressure in the air reservoir, to permit the windings of the motor to cool.

In another application, said signal from the sensing means may be compared with said datum information to detect whether the variable parameter is at or below a second threshold value lower than the first mentioned threshold value, and a signal is sent to the first and/or second actuating element when the variable parameter is below the second threshold value, to change the state of operation of the apparatus to said other of said second and third operational states.

Preferably, particularly in an application where said first actuating element is a motor, a signal is sent to the motor to change the state of operation of the apparatus to an off state, when the variable parameter is at or above, the second higher threshold value, or at or below the first threshold value.

If desired a variable condition of the apparatus different to said first mentioned variable parameter for example, pressure, may be sensed by a further sensing means and a further signal produced by the further sensing means may be fed to said control device and compared with further datum information to detect when the variable condition reaches a predetermined value and a signal is sent to one of the first and second actuating elements, when the variable condition attains the predetermined value to change the state of operation of the apparatus to one of said second and third operational states, depending on the value of the first mentioned variable parameter sensed by said first mentioned sensing means.

For example, in an air compressor, the variable condition may be the pressure of air within an air reservoir of the air compressor, in which case the further sensing means would detect this pressure and the apparatus would be changed to a low load or off state depending upon the first mentioned variable parameter i.e. the temperature of the windings of the motor sensed by the first mentioned sensing means.

Preferably, the state of operation of the apparatus is changed to an off state when said variable condition attains said predetermined value, and the variable parameter is below the first mentioned threshold value, and the state of operation of the apparatus is changed to a low load state when the variable condition attains the predetermined value and the variable parameter is above the first mentioned threshold value.

In a preferred embodiment, the state of operation of the apparatus is changed to one of said second and third operational states depending also on a predicted length of time between when the value of the variable condition attains the predetermined value, until the value of the variable condition falls below a second predetermined value at which the apparatus is returned to the first operational state.

Thus in addition to the protection given to the windings of a motor in an air compressor by said temperature sensor, the optimum operational state of the motor can be used to achieve greatest economy. For example, it may be more expensive to switch the motor off for short periods, than merely to allow the motor to operate in a low load state.

The method according to the first aspect of the invention is particularly suited to controlling an apparatus in which the first actuating element is a motor and the second actuating element is an auxilliary means such as a valve means which permits the load imposed upon the motor by the apparatus operating in a high load state, to be at least partially relieved, by changing the state of operation of the apparatus to a low load or off state.

One such apparatus is an air compressor having an air reservoir and in which the motor is operational to replenish the air in the reservoir when operating in a high load state.

According to a second aspect of the invention 1 provide a method of controlling a three state apparatus comprising a first actuating element and a second actuating element, said method including the steps of sensing a variable condition of the apparatus with a sensing means, feeding a signal produced by the sensing means to a control device whereby the apparatus is operated in a first operational state when the variable condition sensed has a value less or more than a predetermined value, changing the apparatus to a second or third operational state when the predetermined value is attained, and operating the apparatus in said second or third operational state until the value of the variable condition decreases or increases respectively to a second, lower or higher predetermined value, sensed by the sensing means, the control device responding by returning the apparatus to its first operational state, said method further comprising changing the apparatus to its second or third operational state depending on a predicted length of time between when the value of the variable condition attains said first mentioned predetermined value until the value of the variable condition falls or rises to the second, lower or higher, predetermined value.

Preferably, the length of time is predicted by determining said length of time for at least one previous cycle, and comparing said determined length of time or lengths of time with a datum length of time. For example, if the predicted length of time is less than a datum length of time, the apparatus may be changed to its second operational state e.g. low load, and where the predicted length of time is greater than the datum length of time, the apparatus may be changed to its third operational state, e.g. off.

It will be appreciated that the length of time to be predicted may change for each cycle and preferably therefore the control device determines each said length of time and predicts the next length of time depending on at least one, preferably a plurality of previous determined actual lengths of time.

The method according to the second aspect of the invention may include any of the method steps or other features of the method according to the first aspect of the invention.

According to a third aspect of the invention a control device is provided for controlling a three state apparatus by a method according to the first or second aspects of the invention, said device comprising a first input means to receive a signal from a sensing means detecting a variable condition and an output adapted to pass a signal to a first actuating element of the apparatus to be controlled, and a second output adapted to pass a signal to a second actuating element of the apparatus.

Preferably the device has a further input means to receive a further signal from a further sensing means detecting a variable parameter of the apparatus.

The control device may have means to manually adjust the value of the first mentioned threshold, and/or the second mentioned threshold and/or the first mentioned and/or second predetermined values.

Where the control device predicts a length of time in said method of control, between when the value of the variable condition of the apparatus attains the first mentioned predicted value, to when the variable condition falls to a second predetermined value at which the apparatus is returned to its first operational state, the control device may include a timer means to determine said length of time, the control device being operative to change that state of operation of the apparatus from one of said second and third operational states to said first operational state, when the value of the variable condition sensed by said sensing means falls below the second predetermined value.

Conveniently, the control device comprises a microprocessor, which may have an internal timer means, or an external timer means connected thereto, as required.

BRIEF DESCRIPTION OF THE DRAWINGS

The invention will now be described with the aid of the accompanying drawings in which.

DETAILED DESCRIPTION OF THE PREFERRED EMBODIMENTS

Figure 1:
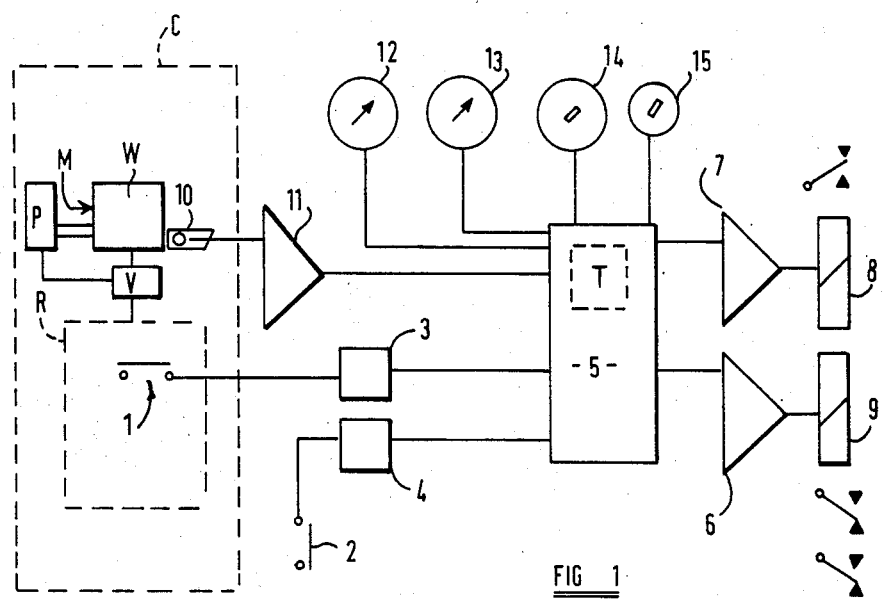
FIG. 1 is a circuit diagram of a control device in accordance with a third aspect of the invention which may be operated to carry out a method in accordance with the first and second aspects of the invention.

Referring first to FIG. 1, a control device for an apparatus such as an air compressor C comprises an input from a sensor means comprising a sensor switch 1 which is sensitive to the pressure of air in an air reservoir of the compressor. When the pressure sensed reached a first, higher, predetermined pressure, sensor switch 1 opens and remains open until the pressure sensed falls below a second lower predetermined pressure at which switch 1 will close.

A manually operable on/off switch 2 is also provided, which, when desired, switches the control device on.

A relay 8, when the contacts thereof are closed, permits a first actuating element comprising a motor M to run power being supplied to the motor either directly via the contacts of the relay 8 or via the contacts of a further relay or switch operated by relay 8. When the contacts of the relay 8 are open, the motor M is switched off.

A second relay 9 operates an auxiliary means, which in this example, comprises a solenoid operated valve means V again either directly or via a further relay, and moves a valve member of the valve means V so as to operate the valve means V in a high or low load position. When the valve means V is in a high load position and the motor M is operating, air compressed by a pump driven by the motor M is directed to an air reservoir R where the compressed air is stored and so the motor M and thus the compressor apparatus C operates in a first high load operational state.

When the valve member is moved by the solenoid of relay 9 to a low load position, and the motor M is operating, the air compressed by the motor M does not pass into the reservoir but, for example, the air is evacuated or the compressing ability of the pump P is reduced so that the motor M is operated in a second low load or idle operational state and hence the compressor apparatus C is operated in a low load operational state.

The sensor switch 1 supplies an input to a control circuit 5 and the control circuit 5 supplies an output to each of the relays 8 and 9.

A microprocessor is the central component of the control circuit 5 and to ensure that the signals sent from sensing means 1, and switch 2 are readable by the microprocessor 5, a signal conditioner 3,4, respectively is provided to shape the signal produced, into microprocessor readable form.

The outputs from the control circuit 5 to the relays 8 and 9 are amplified by amplifiers 6 and 7 respectively.

There are further connections to the control circuit 5 as follows.

First, manual controls 12, 13, 14 and 15 are provided. Control 13 enables a minimum motor run time to be preset, whilst control 12 enables a minimum motor off-time to be preset. Controls 14 and 15 each enable a threshold temperature to be preset, all for reasons hereinafter explained.

A further input to the control circuit 5 is provided through an amplifier 11, from a temperature sensor 10 which is located in or adjacent the windings W of the drive motor M and thus senses the temperature of the windings W. The temperature sensor 10 may be a simple mechanical thermostatic switch, but preferably is an electronic sensor such as thermistor or the like, and the sensor 10 itself, or the amplifier 11 may have means to convert the, usually analogue, signal produced by the sensor 10, into a digital form readable by the microprocessor of the control circuit 5.

If desired, the mechanical sensor switch 1 described could be replaced by a suitable alternative solid state device, and instead of relays 8 and 9, suitable solid state switching may be provided such as triacs, although the control circuit 5 may need modification to accommodate these.

The individual manual controls 12, 13, 14 and 15 may be individual mechanical dials, but could be a single suitable digital programmer, although again modification to the control circuit 5 may be required.

The control circuit 5 has timer means T for a reason described in relation to the operation of the control device hereinafter. The timer means may be internal of the microprocessor or an external timer means such as a quartz crystal timer, or even a mechanical timer means could be provided to ensure that a time base for the operation of the control circuit 5 is available.

The operation of the control device will now be described.

With the motor running in a first high load predetermined state, air is compressed and passed via the valve means V of the apparatus, held in a high load position by relay 9, into the air reservoir. The pressure of the air in the reservoir R will thus increase and the compressed air may be drawn off for use as and when required, although of course the rate of use should not exceed the rate that the air in the reservoir R is replenished by the motor M.

As the pressure of air in the reservoir R attains a first predetermined value, determined by the characteristic of the sensor switch 1, sensor switch 1 will open, thus signalling the control circuit 5. This will result in the operational state of the motor M and hence compressor, being changed from the high load operational state during which the air is passed into the reservoir R, either to a third, operational state when the contacts of relay 8 will be opened, and the motor M will be switched off, or a second low load operational state when the contacts of relay 8 will remain closed, so that the motor M will continue to run, but the contacts of relay 9 will be opened, to move the valve means V to a low load position.

Whether the motor M is switched to an off or low load operational state depends on the programming of the microprocessor, and the inputs to the control circuit 5, and in particular, a predicted length of time until the pressure in the air reservoir will fall to a second lower predetermined value, and the temperature of the motor windings W as sensed by sensor 10.

Whilst the compressor is in a low load or off operational state, air may continue to be drawn from the air reservoir R for use, and when the pressure falls to the second predetermined value, sensor switch 1 will close and a further signal will be sent to the control circuit 5, via signal conditioner 4, and the control citcuit 5 will respond by returning the compressor C to its first high load state of operation.

To ensure that the motor M is not switched on and off too frequently, which could cause overheating of the windings W due to the high transient currents encountered on start up, the microprocessor is arranged not to switch the motor M off if the temperature of the windings W is above a first threshold value set on control 14, but will cause relay 9 to open to move the valve means V to a low load position, to change the compressor C to a second, low load operational state.

However, if the temperature of the windings W as sensed by the sensor 10 exceeds a second higher threshold value at any time set on control 15, the motor will be switched off regardless of the pressure of air in the air reservoir R, and will remain switched off either until manual intervention returns the compressor to an "on" operational state, or until the temperature of the windings W falls to an acceptable level, for example below the first threshold temperature set on control 14.

The time for which the motor M operates in a high load and low load state, is timed with the internal timer T of the microprocessor and an effective motor run time, which is denoted here at T1 is calculated. The effective maximum run time T1 is calculated by the microprocessor on the basis that the time for which the motor operates under high load is added to one half of the time (or any other desired proportion) for which the motor operates under low load. The time for which the motor is switched off or operates in a low load or idle state is denoted T2.

When the sensor switch 1 detects that the air pressure has reached the first predetermined value, the effective motor run time T1, is compared with the minimum run time T3 setting of control 13, by the microprocessor. The motor M may be switched to an off state only if the effective motor run time T1 exceeds the minimum preset run time T3 on control 13.

Further, the motor M may only be switched to an off state if a predicted length of time T4 until the pressure of air in the reservoir R will fall to a second lower predetermined value is greater than the minimum preset off time T5 set on control 12.

Still further, the motor may only be switched to an off state if the temperature of the windings W as sensed by sensor 10, is below the maximum temperature set on control 14.

Thus for the motor M to be switched to an off state i.e. the contacts of relay 9 to be opened, all of the following criteria need to be satisfied.
1. The temperature of the windings W of the motor M must be below the first lower threshold value i.e. the maximum temperature as preset on control 14.
2. The effective run time T1 of the motor M, must be greater than the minimum run time T3 preset on control 13.
3. The predicted length of time T4 until the pressure in the reservoir R will fall to a second lower predetermined value, must be greater than the minimum time T5 preset on control 12.

If any of these criteria fail, the valve means V will be operated in a low load position and the motor M will continue to run.

To predict the length of time until the pressure of air within the reservoir R falls to the second lower predetermined value, the microprocessor measures each actual previous off/low load times T2 and uses a statistical calculation.

For example, the microprocessor may simply store a plurality e.g. five previous off/low load times T2 or more and calculate the average off/low load time which is then the predicted off/low load time T4. The microprocessor may be programmed to give greater weight to the immediately preceding off/low load time, and any other mathmatical/statistical parameters may be included in the microprocessor programming to give an accurate predicted time T4. For example, a standard deviation may be subtracted or added to the averaged time, or a mean average deviation or exponentially smoothed mean average deviation may be added to or subtracted from the average time for which the motor operates on previous cycles in an off or low load state.

In one example, the microprocessor makes an experimental smoothed calculation, on the basis of all previous actual measured effective motor run times T1 and the previous predicted time T4, using the formula:

$$T4' = T4 \times (1-y) + (T1 \times y)$$

where
T4' is the new predicted time
T4 is the previous predicted time
T1 is the previous effective motor run time
y is a smoothing factor Of course, the larger the value of y, the less weight is given to previous effective motor run times and predicted times.

In an arrangement as described in relation to FIG. 1, if desired the temperature sensor 10 input may be omitted if not required, or may be replaced by any other sensor which senses a variable parameter of an apparatus, for example pressure or illumination, although a sensor to sense temperature is preferred in the air compressor application described.

Where the control device is to be used to control other three state apparatus, the pressure switch 1, may be replaced with any other further sensor means in which case the signal conditioner 3, may not be required.

Although the outputs from the control circuit 5 have been described as controlling relays 8,9, which operate a motor W and a valve means V, in another application, the outputs may control other actuating elements of an apparatus such as a light or sound producing element, such as an alarm.

Figure 2:
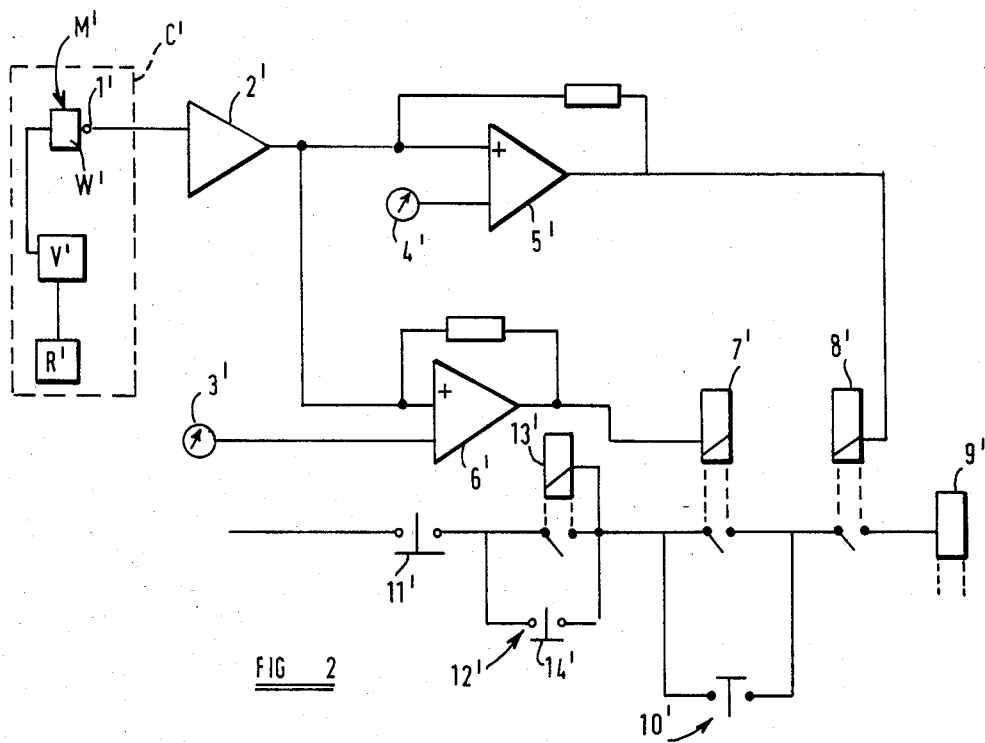
FIG. 2 is another control circuit of an alternative control device in accordance with the third aspect of the invention.

Referring now to FIG. 2, an alternative control device is described, again in relation to the operation of an air compressor C' although it will be appreciated the device may be used to operate other three state apparatus.

The apparatus comprises a temperature sensor 1' which produces a signal proportional to a variable parameter being sensed. In the present example, the sensor 1' is placed adjacent the windings W' of a motor M' of the compressor C' and senses the temperature of the windings W'. The signal produced is amplified by an amplifier 2' and passed to two comparators 5',6'. Two manual set controls 3',4' are provided. On control 3' a minimum threshold temperature $t_{min}$ is set; on control 4' a maximum threshold temperature $t_{max}$ is set.

If the temperature sensed by sensor 1' is above the minimum threshold temperature $t_{min}$, an output is produced from comparator 6' to relay 7' or an alternative solid state switching means, to ensure that the first actuating element i.e. the compressor motor M', is maintained running regardless of any signal from a control 10'. Control 10' may for example, be a switch operated by a pressure sensor which normally senses the pressure of air in the reservoir R' of the compressor C'. If the pressure reaches a predetermined value, the control 10' is opened. If the contacts of relay 7' are open, denoting that the temperature sensed by sensor 1' is below the minimum temperature, the first actuating element i.e. motor M' controlled by relay 9' is switched off. If the contacts of control 10' are open because the temperature sensed by sensor 1' is above $t_{min}$, the motor M' will continue to run, as power will be supplied via contacts of relay 7', assuming that the contacts of a break relay 8' are also closed.

If the temperature sensed by sensor 1' rises at any time above the second threshold temperature $t_{max}$ set on control 4', which is higher than the temperature $t_{min}$, the comparator 5' will signal the contacts of break relay 8' to open, so that the motor M' is switched off and remains switched off until manual intervention returns the apparatus to a "on" operating state, regardless of the output from control 10' or relay 7'.

The control 10' may be operated in response to a pressure sensor 1, as in the FIG. 1 embodiment, and may include means to change the operational state of the air compressor C' from a high load operational state to a low load operational state by signalling a second actuating element such as a solenoid operated valve means V', when the air pressure in the air reservoir attains a first predetermined value and the motor M' continues to operate because relay 7' is closed.

The control device of FIG. 2 includes a main manaually operated on/off switch 11', and a lock on relay operated actuating circuit 12' comprising a relay 13' and a further manual switch 14'.

Each of the comparators 5',6', has, connected between the input derived from sensor 1' and its output to relay 8',7' respectively, a resistor r, the value of which may be chosen to match the signal levels of the sensed inputs and manually set inputs from control 3',4' during calibration.

Thus the sensor 1' and associated circuitry provides protection for the motor M' of the air compressor C' so that if the temperature of the windings W' of the motor M' rises, due for example to frequent switching on and off in response to control 10' i.e. the sensor or sensors sensing the air pressure within the air reservoir R', the motor M' will be maintained in an "on" condition whilst the apparatus is changed to a low load operational state to permit the windings W' of the motor M' to cool.

In both the FIG. 1 and FIG. 2 embodiment, modifications may be made to the devices described without departing from the scope of the invention. It will be appreciated that the devices may be used to control three state apparatus other than the air compressor C or C' described. In this event, the three states need not be off, high and low load, but may be for example, fully on, half on, and quarter on, or the three states may be the result of the operation of three separate actuating elements each of which are operated to produce an alternative operational state.

I claim:
1. A device for controlling a three state apparatus, said apparatus having three operational states, namely an off state, a low load state and a full load state, said apparatus comprising a first actuating element and a second actuating element, said first actuating element being operative to switch the apparatus between its full load and off operational states and said second actuating element being operative to switch the apparatus between its full load and low load operational states, said device including:
   means for continuously sensing a variable condition of said apparatus and for producing a first signal in response to said variable condition;
   control means, responsive to said first signal for comparing said first signal with datum information and detecting whether said variable condition has reached a first predetermined value, said control means further including means for changing the state of operation of said apparatus from said full load to one of said off and low load operational states when said variable condition attains said first predetermined value, said off or low load operational state depending upon a first variable parameter other than said variable condition, said control means further including means for returning said apparatus to its full load operational state when said variable condition reaches a second predetermined value;
   said device further including means for computing a length of time for said variable condition to change from said first predetermined value to said second predetermined value and means for switching said apparatus to said low load operational state in preference to said off operational state when said variable condition attains said first predetermined value, only when said length of time is shorter than a predetermined duration.
2. The device according to claim 1, wherein said control means includes means for determining an actual length of time taken at least once previously for a value of said variable condition to change from said first predetermined value to said second predetermined value, and for predicting a next length of time based upon said at least one previously determined actual length of time.
3. A device for controlling a three state apparatus, said apparatus having three operational states namely an off state, a low load state and a full load state, said apparatus comprising a first actuating element and a second actuating element, said first actuating element being operative to switch the apparatus between its full load and off operational states and said second actuating element being operative to switch the apparatus between its full load operational state and its low load operational state, said device including:
   means for continuously sensing a variable condition of said apparatus and for producing a first signal in response to said variable condition;
   control means, responsive to said first signal, for comparing said first signal with a first datum information and detecting whether the said variable condition has reached a first predetermined value, said control means further including means for changing the state of operation of said apparatus from said full load to one of said off and low load operational states when said variable condition attains said first predetermined value, said off or low load operational state depending upon a first variable parameter other than said variable condition;

means for sensing said first variable parameter, said control means responsive to said first variable parameter, and further including means for comparing said first variable parameter with a second datum information and detecting whether said first variable parameter is at least a first threshold value, said control means including further means for sending a second signal, when said variable condition attains said first predetermined value, to said second actuating element, when said first variable parameter is above said first threshold value, changing the state of operation of said apparatus to said low load state and for sending a third signal, when said variable condition attains said first predetermined value, to said first actuating element, when said first variable parameter is at least said first threshold value and no other parameter requires said apparatus to be changed to said low load operational state, changing the state of operation of said apparatus to the off operational state; and said control means further including means for returning said apparatus to said full load operational state when said variable condition changes to a second predetermined value.

4. The device according to claim 3, wherein said first variable parameter sensing means includes means for detecting whether said first variable parameter is at or above a second threshold value, said second threshold value being higher than said first threshold value, when said apparatus is operating in one of its full load and low load operational states, said control means further including means for sending a fourth signal to said first actuating element when said first variable parameter is at least said second threshold value and for changing a state of operation of said apparatus to said off operational state.

5. The device according to claim 3, further including means for computing a length of time for said variable condition to change from said first predetermined value to said second predetermined value and said means for changing includes means for changing the state of operation of said apparatus to said low load operational state when the value of said variable condition attains said first predetermined value and said variable parameter is below said first threshold value only when said length of time is shorter than a predetermined duration.

6. The device according to claim 3, wherein said three state apparatus is an air compressor having an air reservoir and a drive motor having windings, said motor operational to replenish compressed air in the reservoir when said apparatus is operated in said full load state, said first actuating element comprises an on/off switch for said motor and said second actuating element comprises auxiliary means for at least partially relieving a load imposed upon said motor by said apparatus operating in its full load state, said variable condition comprises air pressure within said reservoir and said variable parameter comprises a temperature of said motor windings.

7. The method of controlling an apparatus which has three operational states namely an off state, a low load state, and a full load state, the apparatus comprising a first actuating element and a second actuating element, the first actuating element being operative to switch the apparatus between its full load and off operational states and the second actuating element being operative to switch the apparatus between its full load and low load operational states, said method comprising the steps of:

continuously sensing a variable condition of the apparatus by a sensing means and producing a signal in response to said variable condition;

feeding the signal to a control means and comparing the signal with datum information to detect whether the variable condition has reached a first predetermined value;

changing the state of operation of the apparatus from the full load to one of the off and low load operational states when the variable condition attains said first predetermined value, said off or low load operational state depending upon a first variable parameter other than said variable condition;

operating the apparatus in said off or low load operational state until said variable condition changes to a second predetermined value sensed by the sensing means;

returning the apparatus to its full load operational state;

computing a length of time for said variable condition to change from said first predetermined value to said second predetermined value;

switching the apparatus to the low load operational state in preference to the off operational state when said variable condition attains said first predetermined value, only when said length of time is shorter than a predetermined duration.

8. A method according to claim 7, wherein, prior to said computing steps there is a further step of determining an actual length of time taken at least once previously for said variable condition to change from said first predetermined value to said second predetermined value, and said computing step includes predicting a next length of time depending upon said at least one previously determined actual length of time.

9. A method of controlling an apparatus which has three operational states namely an off state, a low load state and a full load state, the apparatus comprising a first actuating element and a second actuating element, the first actuating element being operative to switch the apparatus between its full load and off operational states and the second actuating element being operative to switch the apparatus between its full load and low load operational states, said method including the steps of:

continuously sensing a first variable condition of the apparatus by a first sensing means and producing a first signal in response to said first variable condition;

feeding the first signal to a control means and comparing the first signal with a first datum information to detect whether the first variable condition has reached a first predetermined value;

changing the state of operation of the apparatus from the full load to one of the off and low load operational states when the first variable condition attains said first predetermined value, said off or low load operational state depending upon a first variable parameter other than said first variable condition;

sensing said first variable parameter with a second sensing means;

feeding a second signal produced by the second sensing means to the control means;

comparing said second signal in the control means with a second datum information and detecting whether said first variable parameter is at least a first threshold value;

sending a third signal, when said first variable condition attains said first predetermined value, to the second actuating element when the first variable parameter is above said first threshold value, changing the state of operation of the apparatus to said low load state;

sending a fourth signal, when said first variable condition attains said first predetermined value, to the first actuating element, when the first variable parameter is at least said first threshold value and no other parameter requires the apparatus to be changed to said low load operational state, changing the state of operation of the apparatus to the off operational state; and returning the apparatus to its full load operational state when the first variable condition changes to a second predetermined value.

10. The method according to claim 9, wherein said first variable parameter sensing step is continuous and said second sensing means signal comparing and detecting step includes the step of detecting whether said first variable parameter is at or above a second threshold value, said second threshold value being higher than said first threshold value, when the apparatus is operating in one of its full load and low load operational states, and the method includes a step of sending a signal to the first actuating element when said first variable parameter is at least said second threshold value to change the state of operation of the apparatus to said off operational state.

11. The method according to claim 9, including a further step of computing a length of time for said first variable condition to change from said first predetermined value to said second predetermined value, wherein said changing step includes changing the state of operation of the apparatus to said low load operational state when said first variable condition attains said first predetermined value and said first variable parameter is below said first threshold value only when said length of time is shorter than a predetermined duration.

12. The method according to claim 9, wherein the apparatus is an air compressor having an air reservoir and a motor having windings, said motor being operational to replenish compressed air in the reservoir when the apparatus is operating in said full load state, said first actuating element comprises an on/off switch for the motor and said second actuating element comprises an auxilliary means for at least partially relieving a load imposed upon the motor by the apparatus operating in its full load state, the first variable condition comprises air pressure within said reservoir and said first variable parameter comprises a temperature of the windings of the motor.

* * * * *